(12) United States Patent
Unterlander et al.

(10) Patent No.: US 7,198,400 B2
(45) Date of Patent: Apr. 3, 2007

(54) STATIC MIXER AND A METHOD OF MANUFACTURE THEREOF

(75) Inventors: Richard Unterlander, Nobleton (CA); Maciej Brelski, Brampton (CA); Robert Schad, North York (CA); Peter Lacza, North York (CA); Denise Craig, Toronto (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 194 days.

(21) Appl. No.: 10/429,600

(22) Filed: May 3, 2003

(65) Prior Publication Data

US 2004/0218469 A1 Nov. 4, 2004

(51) Int. Cl.
*B01F 5/06* (2006.01)
*B29B 7/58* (2006.01)

(52) U.S. Cl. .................. 366/336; 366/80; 366/340

(58) Field of Classification Search ............... 366/336, 366/340, 80; 425/197, 199, 205, 207
See application file for complete search history.

(56) References Cited

U.S. PATENT DOCUMENTS

| | | | | |
|---|---|---|---|---|
| 2,584,827 A | * | 2/1952 | Bailey | 366/69 |
| 2,971,219 A | * | 2/1961 | Hill | 425/463 |
| 3,106,746 A | * | 10/1963 | Sunday | 425/462 |
| 3,404,869 A | | 10/1968 | Harder | |
| 3,583,678 A | | 6/1971 | Harder | |
| 3,609,806 A | * | 10/1971 | Schippers et al. | 425/197 |
| 3,785,620 A | | 1/1974 | Huber | |
| 3,817,675 A | | 6/1974 | Maiocco | |
| 3,871,624 A | * | 3/1975 | Huber et al. | 366/336 |
| 3,989,434 A | | 11/1976 | Mercer | |
| 4,027,857 A | * | 6/1977 | Cunningham | 366/340 |
| 4,150,932 A | * | 4/1979 | Moghe | 425/197 |
| 4,170,446 A | | 10/1979 | Schutz et al. | |
| 4,201,482 A | | 5/1980 | Imhauser et al. | |
| 4,216,253 A | * | 8/1980 | Bonnebat et al. | 428/36.92 |
| 4,466,741 A | * | 8/1984 | Kojima | 366/339 |
| 4,497,751 A | | 2/1985 | Pluss | |
| 4,497,752 A | | 2/1985 | Huber | |
| 4,497,753 A | | 2/1985 | Streiff | |
| 4,541,982 A | * | 9/1985 | Upmeier | 264/349 |
| 4,692,030 A | | 9/1987 | Tauscher et al. | |
| 4,719,090 A | * | 1/1988 | Masaki | 422/310 |
| 4,848,920 A | | 7/1989 | Heathe et al. | |
| 4,882,130 A | * | 11/1989 | Asai et al. | 422/310 |
| 4,971,450 A | * | 11/1990 | Gerich | 366/340 |
| 5,421,715 A | | 6/1995 | Hofstetter et al. | |
| 5,435,061 A | | 7/1995 | Lantz | |

(Continued)

FOREIGN PATENT DOCUMENTS

EP 0 293 756 12/1988

*Primary Examiner*—Tony G. Soohoo

(57) ABSTRACT

A static mixer comprising a mixer body with a first and a second array of intermeshed and interconnecting passageways formed therein that connect, and provide a convoluted flow path between, flow faces at ends of the mixer body. The first and second arrays of passageways preferably interconnect such that the boundaries of adjacent intermeshed passageways overlap to form mixing portals. When used in an injection molding system, a singular melt flow is initially divided at the first flow face of the static mixer, wherein the melt flow divides into the intermeshing passageways and further divides and re-combines at the locations of mixing portals before exiting the static mixer at the second flow face as homogenized melt.

78 Claims, 12 Drawing Sheets

U.S. PATENT DOCUMENTS

| | | |
|---|---|---|
| 5,520,460 A | 5/1996 | Lantz |
| 5,564,827 A | 10/1996 | Singer |
| 5,683,731 A | 11/1997 | Deardurff et al. |
| 5,688,047 A | 11/1997 | Singer |
| 5,851,067 A | 12/1998 | Fleischli et al. |
| 5,913,324 A | 6/1999 | Singer |
| 5,941,637 A | 8/1999 | Maurer |
| 5,944,419 A | 8/1999 | Streiff |
| 6,089,468 A | 7/2000 | Bouti |
| 6,161,730 A | 12/2000 | Heusser et al. |
| 6,341,954 B1 | 1/2002 | Godwin et al. |
| 6,383,422 B1 * | 5/2002 | Hoffschmidt ................ 264/44 |
| 6,394,644 B1 | 5/2002 | Streiff |
| 6,520,702 B2 | 2/2003 | Heusser |
| 2001/0015936 A1 | 8/2001 | Heusser et al. |

* cited by examiner

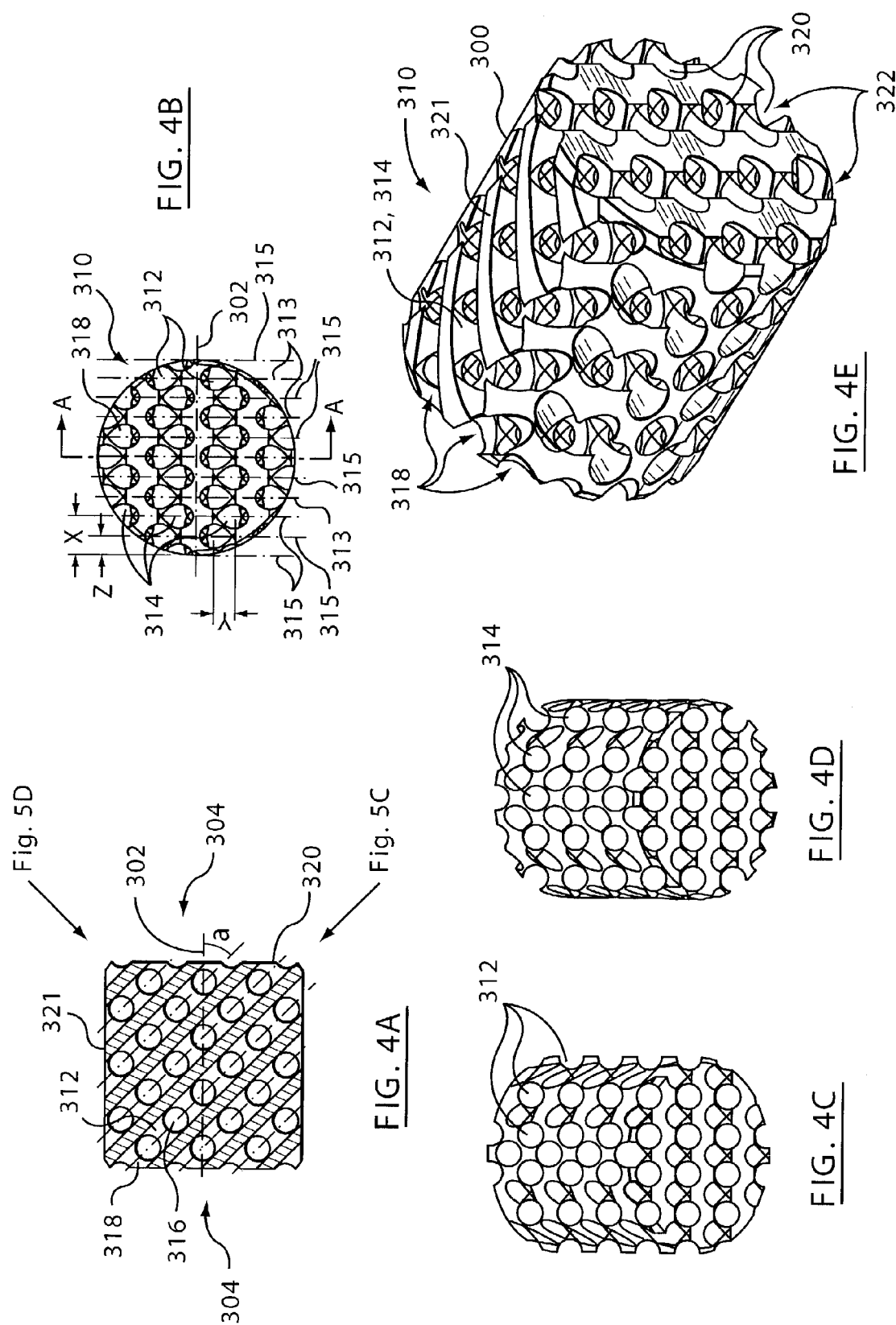

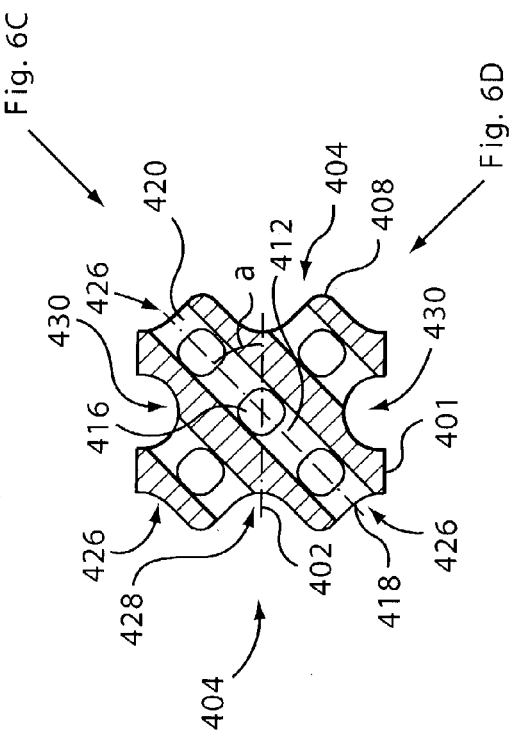
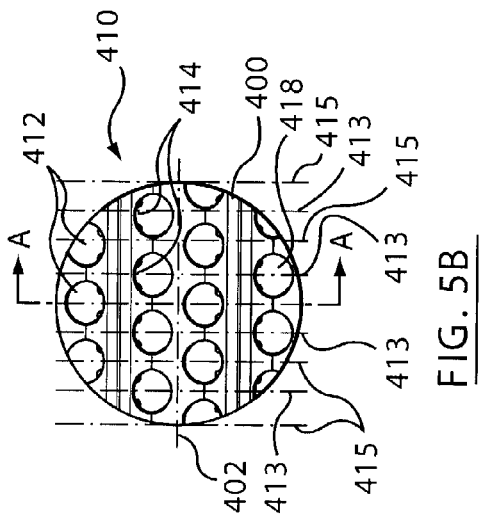
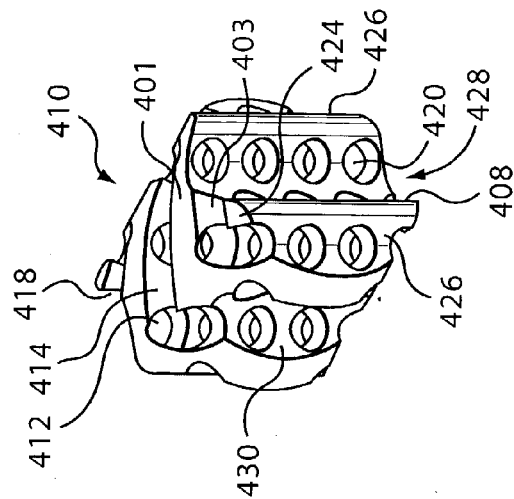
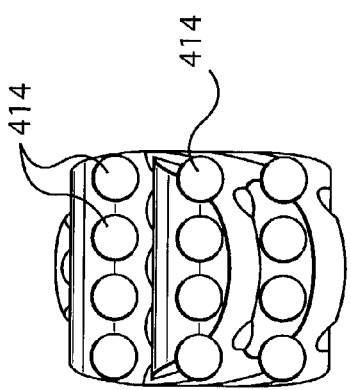
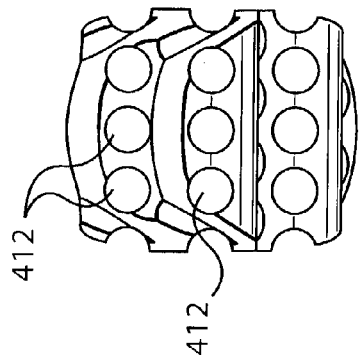

STATIC MIXER AND A METHOD OF MANUFACTURE THEREOF

BACKGROUND OF THE INVENTION

1. Field of the Invention

The present invention relates in general to a device for the homogenization of viscous fluids, and more especially to high-viscosity fluids, and also to a use of such a device. Particularly, but not exclusively, the present invention relates to a static mixer for use in a molding system for generating a substantially homogeneous flow of molding material, such as with the injection molding of preforms from polyethylene terephthalate (PET) and the like.

2. Background Information

A well-established application for static mixers is in conjunction with the extrusion and injection molding of thermoplastic materials, wherein the use of at least one static mixer in the melt stream provides for an improvement in the homogeneity of the melt properties. In particular, it is quite common to incorporate static mixers at the discharge of an injection assembly, in the melt channels of a mold runner system or within the nozzles adjacent the mold cavities. For example, U.S. Pat. Nos. 4,170,446 and 5,564,827 provide a mixing head in the machine nozzle that operates to counter the fact that: the plastic melt, upon leaving the screw, exhibits considerable temperature differences; when coloring agents and/or additives are added, their distribution can also be irregular; and the distribution of acetaldehyde (AA), a thermal degradation product of PET, can also be poorly distributed. U.S. Pat. Nos. 5,421,715, and 5,683,731 provide examples wherein static mixers are incorporated into the melt channels of a hot runner to provide melt property homogeneity, particularly with respect to melt temperature, AA distribution, and to reduce the disadvantageous effects of thermal degradation in the boundary layers. U.S. Pat. Nos. 5,941,637 and 6,089,468 provide examples of static mixers incorporated in the nozzle of a runner system to reduce the disadvantageous effects of the thermal degradation in the boundary layers and to eliminate weld lines.

The use of static mixers in multi-cavity preform molding systems, such as used in PET systems, is known to provide a more uniform AA distribution in the melt stream, which in turn provides for a more consistent AA level between preforms within the same molding shot. The amount of AA present in preforms, which are subsequently blown into beverage bottles, is of particular concern given that AA, even in small amounts, is known to impart an undesired taste to the beverage contained in the bottles. AA is a thermal degradation product of PET and is primarily the result of shear heating of the melt in the extruder, but also arises from boundary effects as the melt travels though the melt channels of the runner system to the molding cavities. European Patent Application 293 756 and U.S. Pat. No. 6,341,954 thoroughly discuss the problems associated with AA formation and distribution in a multi-cavity hot runner system.

The most common class of static mixers operates by dividing and recombining the fluid flow several times during its passage through the mixer, as exemplified in U.S. Pat. Nos. 5,564,827 and 6,394,644. The way in which this is done varies considerably, with a myriad of alternatives to both the basic configuration of the static mixer and the methods for their manufacture.

U.S. Pat. No. 5,564,827 describes a static mixer 10, as shown in FIG. 1, comprising webs 12 of bars 14 that are arranged in a plurality of layers along a longitudinal axis, the webs of adjacent layers crossing each other and being inclined relative to the longitudinal axis. The static mixer also includes a ring-shaped flange 16 situated at its middle. Further, the static mixer is formed as a monolithic structural member, essentially an integrally formed body, in an attempt to avoid weaknesses at the joints between the webs. However, the results from a stress distribution analysis conducted on such a mixer, at typical operating pressure of an injection molding system of between 1300 and 1700 bar (130 and 170 MPa), the static mixer made from wear-resistant cast non-ferrous alloy STELLITE 21, shows excessive localized stress at the connections 18 of the bars with the ring and connections 20 between bars. Indeed, the induced stress is calculated to exceed the strength of the material. In practice, the static mixer has proven to fail as predicted when used in the nozzle adapter of injection unit for an injection molding system producing preforms.

A variant to the previously mentioned static mixer, as shown in FIG. 1B, does away with the integrally formed ring, and is replaced with a separate supporting spacer 30 for supporting the mixing elements 32. The results from a stress distribution analysis conducted on such a mixer, and with the mixer element and supporting spacer made from STELLITE 21, again at typical injection molding pressure, predicts that the elimination of the ring has the effect of eliminating tangential (hoop) stress and outward radial pulling forces acting on bars. As a result, the stress level is generally lower. However, the design instead suffers from excessive stress in the vicinity of support areas 34 caused by the reaction forces exerted by the spacer. There is also excessive stress at the connections 20 between bars induced by rotation of the bars caused by collapsing of the structure under melt pressure. The stress exceeds the ultimate strength of material, and structural failure is again likely.

U.S. Pat. No. 6,394,644 describes a mixer element 40, as shown in FIG. 2, wherein multiple mixer elements may be stacked to form a static mixer. The mixer elements comprise a generally ring-shaped support 42 and a plurality of elongated crossbars 46 arranged in at least two separate intersecting oblique planes in the flow path to cause mixing of a fluid. The results from a stress distribution analysis conducted on such a mixer element, again at typical injection molding pressure and with the mixer element made from STELLITE 21, shows excessive stress at the connections 48 of the bars with the ring and at the connections 49 between the crossbars 46. The stress is understood to exceed the ultimate strength of material with structural failure of the mixer elements therefore likely.

Both the '827 and '644 static mixers are made of a metallic alloy by such methods as investment casting, and sinter injection molding, as generally described in U.S. Pat. No. 5,688,047. Such methods of manufacture are regarded generally as being technically challenging to execute, expensive (e.g. expensive patterns, costly die design and manufacturing). And in any event, without secondary processing techniques that incur additional expense, parts produced by such methods generally have mechanical properties that are less than identical parts machined from wrought or cast billets of the same material.

Another class of static mixers, worth mentioning for the sake of their configuration, operate by simply splitting the incoming melt stream into multiple paths that are then reoriented and discharged into a chamber prior to entering a second stage of splitting and reorientation, as exemplified in U.S. Pat. No. 3,583,678. However, the channels do not intersect and therefore mixing efficiency is low.

Therefore, the most basic problem with known static mixers is that they do not provide the desired combination of effective mixing, particularly in view of AA distribution in plastic melts of PET, with the required resiliency to indefinitely withstand the substantial and cyclic operational pressures of a plastic injection molding system. In practice, the failure of a static mixer in an injection molding system has proven to be catastrophic, with mixer remnants flowing throughout the mold runner system, requiring a complete refurbishment of the tool and lost production, both at a significant financial cost.

In addition, it is desired to have a static mixer that provides effective mixing and has the required resiliency to indefinitely withstand use in a plastic injection molding system. This is particularly true when considering the desire to provide a static mixer of an overall size that may be retrofitted into existing systems to replace known static mixers that have proven incapable of withstanding the operating conditions over long durations of time. Further, it is desired to be able to produce static mixers at a much lower cost than previously possible, along with other desirable attributes such as a low pressure-drop and minimal melt stagnation.

SUMMARY OF INVENTION

In accordance with a first aspect of the present invention, a static mixer is provided that comprises a mixer body having opposite ends, with a first flow face at one of the ends and a second flow face at the other of the ends, the mixer body having a plurality of first passageways and a plurality of second passageways, each first passageway interconnecting to an adjacent second passageway at a mixing portal. At least a subset of the passageways extend through the flow faces to create fluid portals, the first and second passageways arranged in the mixing body to connect the first and second flow faces, the interconnected passageways providing a convoluted flow path between the flow faces.

Overlapping the boundaries of the first and second passageways preferably form the mixing portals.

The static mixers may include a plurality of routing grooves to ensure that the fluid to be mixed cannot stagnate.

The static mixers may be arranged in a nozzle adapter assembly, the nozzle adapter assembly providing a connection between a barrel and a sprue of an injection mold runner system in an injection molding system.

In accordance with a another aspect of the present invention, a method for manufacturing the static mixer is provided that comprises the steps of forming first and second arrays of intermeshed and interconnected passageways through the elongate body, and cutting the elongated body across its length, along a cutting plane, to form a plurality of static mixers.

The step of forming the first and second arrays of intermeshed and interconnected passageways passageways may be performed by means of a forming tool driven along a first and second array of forming tool path centerlines arranged through the elongate body along a first and second set of forming planes respectively.

The method for manufacturing a static mixer of claim may further include the step of milling routing grooves.

An advantage of the static mixers of the present invention is that they provide both satisfactory mixing performance and high fatigue safety factors suitable for use in an injection molding system. In particular, a static mixer is provided that is capable of being used in an injection molding machine producing preforms made from PET for the purposes of reducing and uniformly distributing, for example, acetaldehyde in the melt stream. The static mixer elements may be formed from bar-stock, and accordingly have none of the characteristic reduction in mechanical properties of static mixers produced by casting or sintering of a powder metallurgical component, and hence have the highest possible mechanical properties for a given material.

Another advantage of the static mixers of the present invention is that they are designed to substantially eliminate the incidence of fluid stagnation and related fluid degradation.

Yet another advantage of the static mixers of the present invention is the ability to manufacture a static mixer simply and at a much lower cost.

These and other and advantages will become more apparent from the following description and drawings wherein like reference numerals depict like elements.

BRIEF DESCRIPTION OF DRAWINGS

Exemplary embodiments of the present invention will now be described with reference to the accompanying drawings in which:

FIGS. 4A, 4B, 4C, 4D, and 4E illustrate a static mixer in accordance with an embodiment of the present invention; FIG. 4A is section view of the static mixer along a section line A—A that is directed along a flow plane that bisects the static mixer, as shown in FIG. 4B; FIG. 4B is an end view of the static mixer; FIGS. 4C and 4D are inclined views of the static mixer directed, as generally indicated in FIG. 4A, along the first and second arrays of passageways respectively; FIG. 4E is a isometric view of the static mixer;

FIGS. 5A, 5B, 5C, 6D, and 5E illustrate a static mixer in accordance with an embodiment of the present invention that has particular utility in an injection molding system; FIG. 5A is section view of the static mixer along a section line A—A that is directed along a flow plane that bisects the static mixer, as shown in FIG. 5B; FIG. 5B is an end view of the static mixer; FIGS. 5C and 5D are inclined views of the static mixer directed, as generally indicated in FIG. 5A, along the first and second arrays of passageways respectively; FIG. 5E is an isometric view of the static mixer;

FIG. 6A is an end view of the elongate member; FIG. 6B is a partially cut-away side view of the elongate member; FIG. 6C is a partial section view through the elongate member along the section line A—A, as shown in FIG. 6B;

FIG. 8A is an end view of the static mixer; FIG. 8B is section view of the static mixer along a section line A—A that is directed along a flow plane of the first array that bisects the static mixer, as shown in FIG. 8A; FIG. 8D is section view of the static mixer along a section line B—B that is directed along a flow plane of the second array of passageways, as shown in FIG. 8A; FIGS. 8C and 8E are inclined views of the static mixer directed, as generally indicated in FIGS. 8B and 8D, along the first and second arrays of passageways respectively; FIG. 8F is the opposite end view of the static mixer; FIG. 8G is an isometric view of the static mixer;

DETAILED DESCRIPTION

Figure 1A:
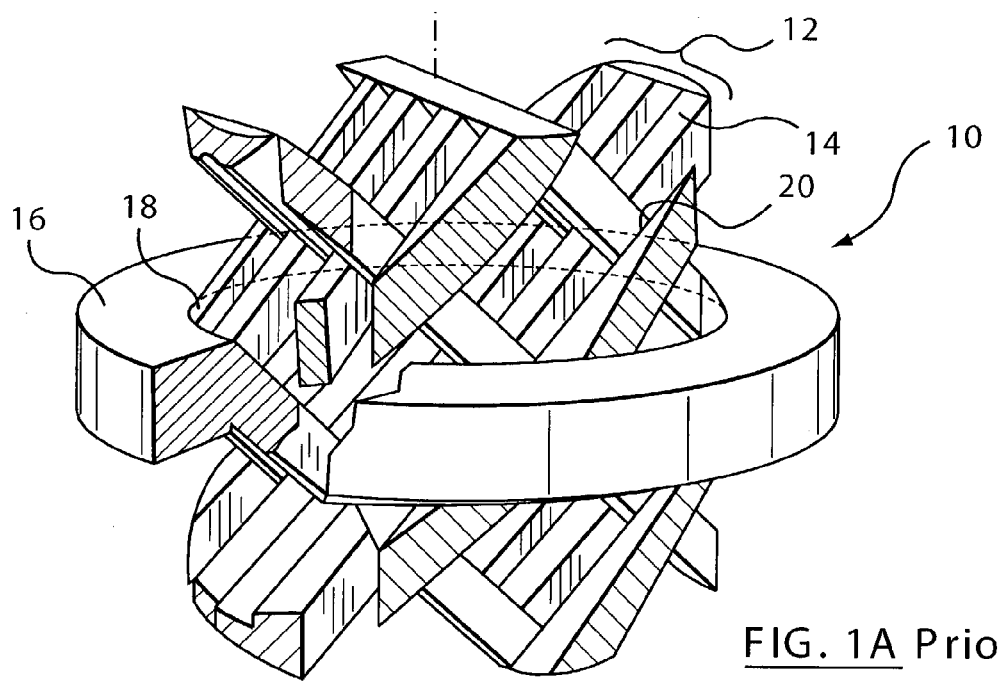
FIG. 1A is a partially cut-away side diagrammatic view of a static mixer of the prior art.
Figure 1B:
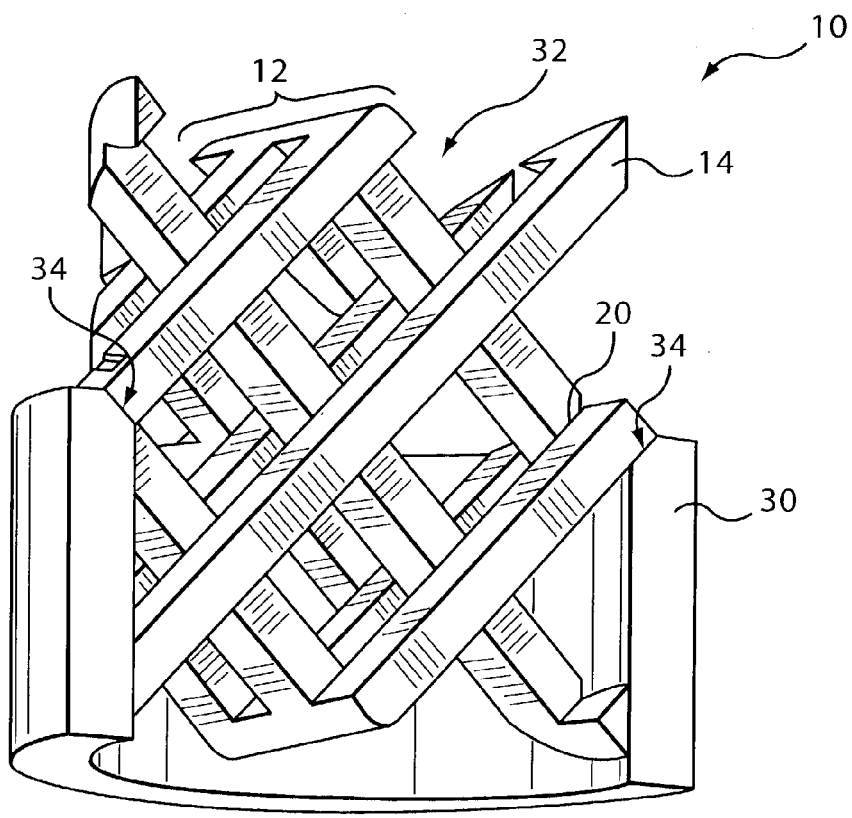
FIG. 1B is a partially cut-away side diagrammatic view of another static mixer of the prior art.
Figure 2:
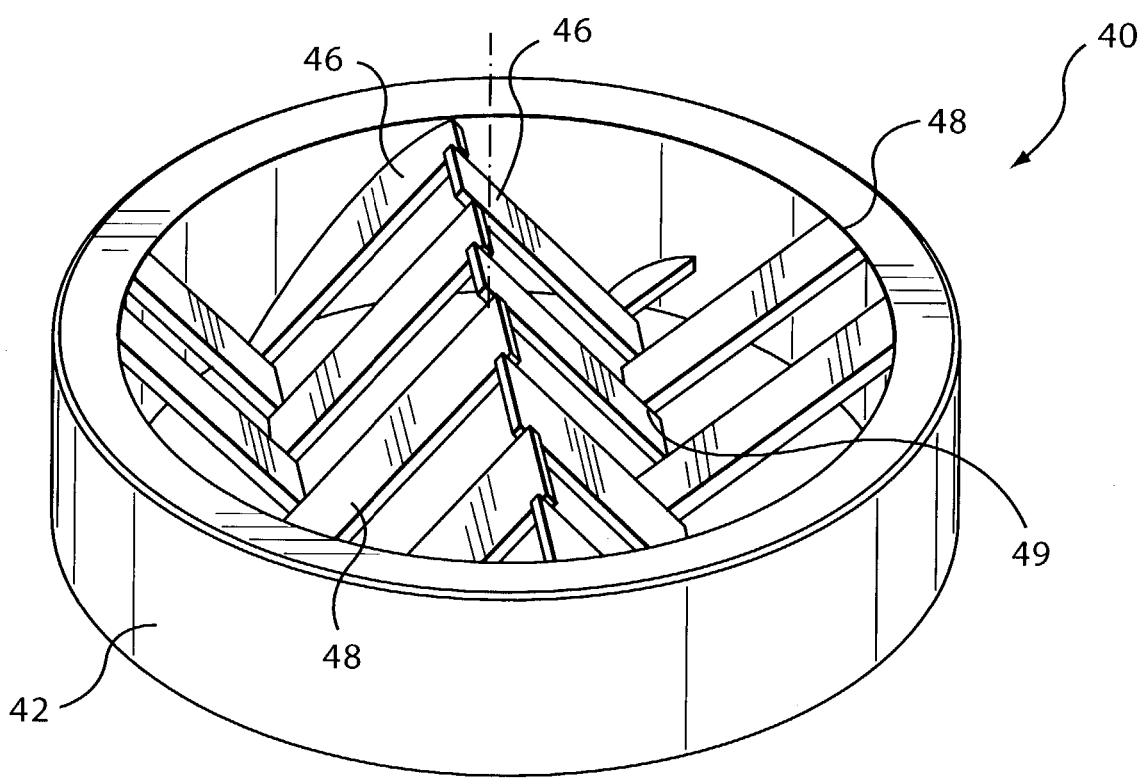
FIG. 2 is an isometric view of a static mixer element of the prior art.
Figure 3:
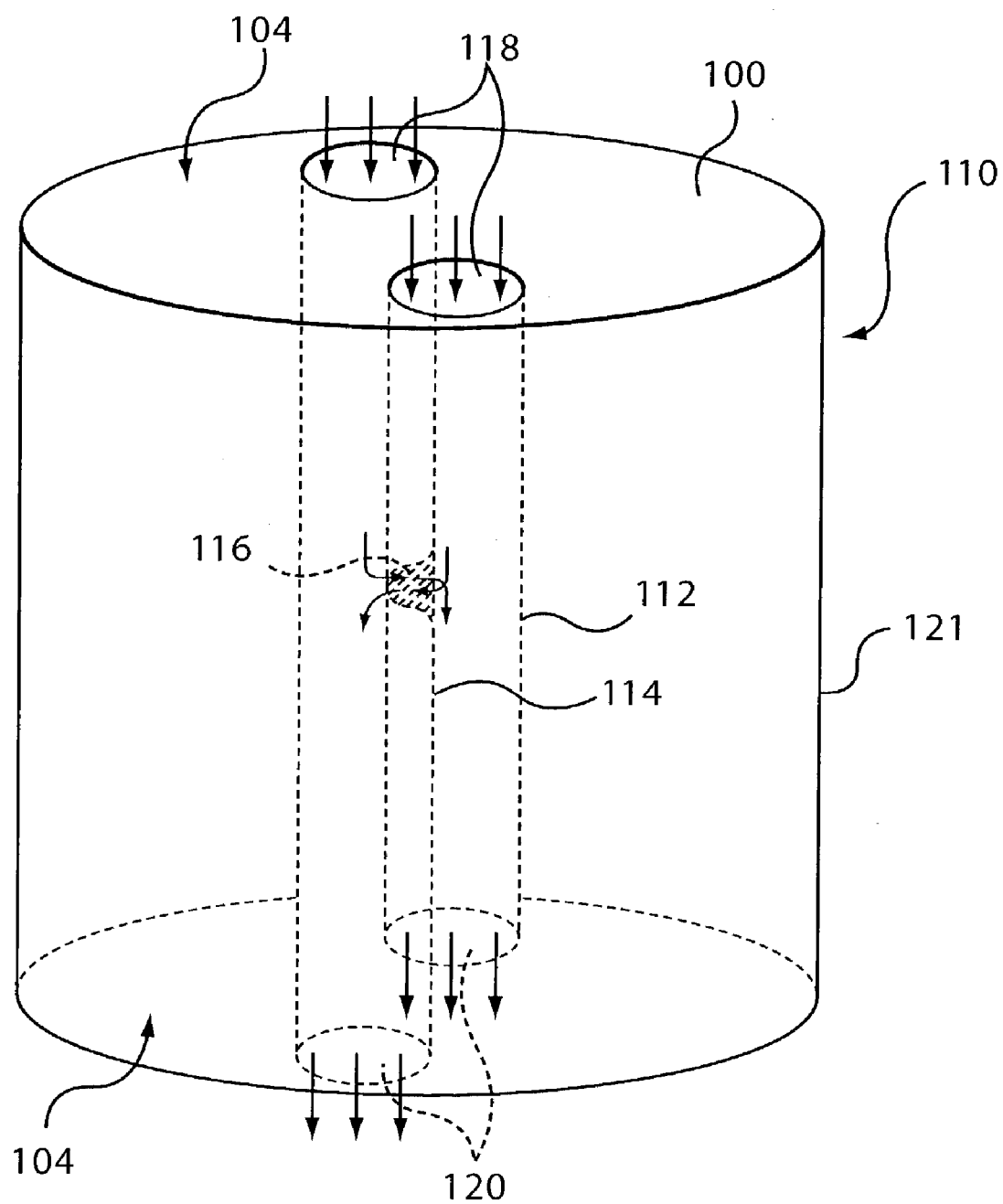
FIG. 3 illustrates a static mixer according to a simplified conceptual embodiment of the present invention.

FIG. 3 illustrates a static mixer 110 according to a simplified conceptual embodiment of the invention. The static mixer 110 comprises a mixer body 100 with a first and a second mutually inclined and interconnected passageways 112 and 114 formed therein that extend between flow faces 104 located at opposite ends of the mixer body 100. A potion of the passageways intersect with overlapping boundaries at a mixing portal 116 to provide a convoluted flow path between, the flow faces 104. In operation, the static mixer 110 is arranged in a fluid flow channel (not shown) wherein a fluid flow interacts with a first mixer flow face 104 and a fluid flow is established through inlet fluid portals 118 of the passageways that are arranged on the flow face 104; the fluid then passes down through the first and second passageway 112 and 114 as first and second flow fields respectively, as represented by the flow lines. The first and second flow fields then encounter the mixing portal 116, wherein a portion of the first and second flow fields collide and thereby mixing of the two flow fields occurs. Thereafter, new first and second flow fields develop in the lower portions of the first and second passageways 112 and 114. The flow fields then exit the static mixer 110 at the outlet fluid portals 120 provided on the second flow face 104. It is to be understood that the first and the second passageways 112 and 114 are preferably arranged in intermeshing arrays thereof to support the entire flow field of the flow channel without causing the stagnation of any portion thereof.

FIGS. 4A, 4B, 4C, 4D, & 4E illustrate a static mixer 310 according to an embodiment of the invention. The static mixer 310 comprises a cylindrical mixer body 300 with a first array of passageways 312 and a second array of passageways 314 intermeshed and interconnected to the first array of passageways 312. Passageways 312 and 314 extend through the mixer body 300 and, through their interconnection, provide a convoluted flow path between the flow faces 304 at the opposing ends of the mixer body 300. A subset of the first and second arrays of passageways pass through the flow faces 304 and creates portals 318 and 320 for the inflow and discharge of fluid. The passageways 312 and 314 are formed through the mixer body 300, with the longitudinal axis of each passageway contained along first and second sets of flow planes 313 and 315 respectively. The first and second set of flow planes 313 and 315 are preferably parallel, perpendicular to a reference plane 302 that bisects the mixer body 300 along its longitudinal axis, oriented with the longitudinal axis of the mixer body 300, and intermeshed in a regular-spaced alternating arrangement. The longitudinal axes of the passageways within a particular array 312 and 314 are oriented such that the passageways are substantially mutually parallel. Preferably, the passageways 312 and 314 are inclined at opposite angles α of 45° from the reference plane 302 and, hence, the passageways 312 and 314 are substantially perpendicular to one another, as shown in FIGS. 4C & 4D. Other angles of inclination are perceived.

Preferably, the passageways 312 and 314 are formed as straight cylindrical bores of a substantially constant and equal diameter. The diameter of the passageways 312 and 314 is such that the boundaries of adjacent intermeshed passageways 312 and 314 overlap to form mixing portals 316 for interconnecting the passageways, as shown in FIG. 4A. The mixing portals 316 preferably have about the same cross-sectional area as the passageways 312 and 314.

Preferably, the array pitch, that is the spacing between the passageways within each array of passageways 312 and 314, is substantially identical, and the spacing between the adjacent flow planes 313 and 315, is about one-half of the array pitch. In other words, dimension 'Z'='X'/2 relative to 'X' as shown in FIG. 5B. The pitch spacing, 'Y' between adjacent rows of fluid portals 318 and 320, along the flow faces 304 as shown in FIG. 5B, is such that the fluid portals 318 and 320 interconnect to form residual-shaped routing grooves 322. In operation, the routing grooves 322 assist by routing the fluid flow into the passageways 312 and 314.

For installation in a flow channel of an injection molding system, the static mixer 310 may be made from a high strength bar stock, such as AISI H-13 tool steel or INCONEL 718.

Figure 7:
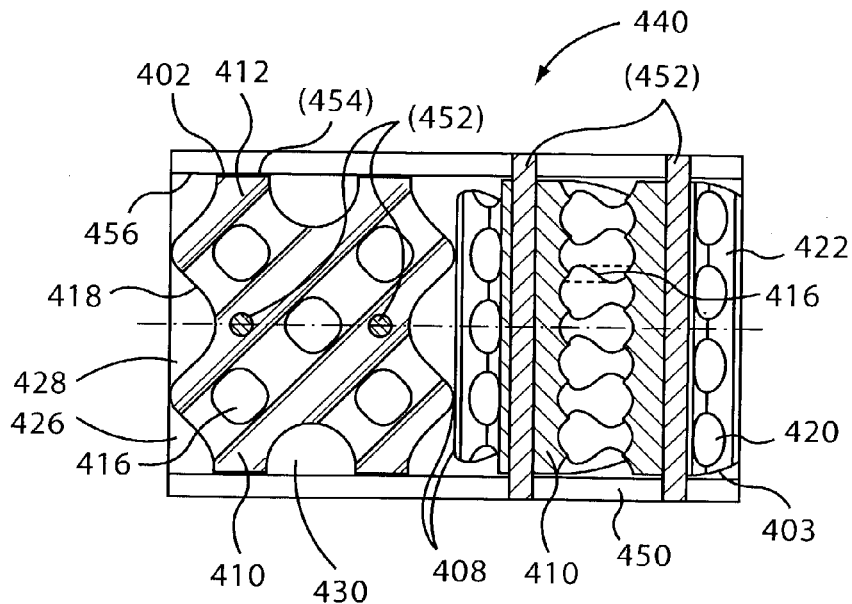
FIG. 7 illustrates a section view of a static mixing assembly that incorporates a stacked arrangement of static mixers according to an embodiment of the present invention.

FIGS. 5A, 5B, 5C, 5D, & 5E illustrate a static mixer 410 according to another embodiment of the invention. The static mixer 410 comprising a cylindrical mixer body 400 with a first and a second array of intermeshed and interconnected passageways 412 and 414 formed through the mixer body 400 that connect, and provide a convoluted flow path between, the flow faces 404 at the ends of the mixer body 400. The static mixer 410 has essentially the same passageway configuration as in the previous embodiment, but is further characterized in that a plurality of routing grooves 426 and 428 extend across each flow face 404 in a direction perpendicular to the flow planes 413 and 415 that interconnect the fluid portals 418 and 420 across the rows of passageways 412 and 414 of the first and second arrays respectively, as shown in FIGS. 5A, 5B & 5E. The medial routing grooves 428 interconnect adjacent rows of passageways portals 418 and 420 of the first and second arrays of passageways 412 and 414 respectively. The lateral routing grooves 426 extend across any unpaired row of passageways portals 418 and 420 at the periphery of the flow face 404. The routing grooves 426 and 428 are preferably formed with a generally rounded profile. In operation, the routing grooves 426 and 428 of the flow faces 404 have the function of expediently routing of an incoming flow field that is interacting with a flow face 404, such as melt in an injection molding system, through the portals 418 and 420 of the flow passageways, thereby inhibiting the stagnation of any portion of the flow field. The routing grooves 426 and 428 also ensure that no fluid finds a location to stagnate between adjacent static mixers 410 arranged in a stack, as shown in FIG. 7.

The flow faces 404 preferably includes no flat surfaces, and includes ridges 408 formed between the medial routing groove 428 and the adjacent lateral routing grooves 426. The ridges 408 may be used to space adjacent stacked static mixers 410 in a mixer assembly, as will be explained hereinafter.

The static mixer 410 further includes diverter routing grooves 430 that extend across the outer surface 401 of the static mixer 410, in a direction perpendicular to the longitudinal axis of the mixer body 400 and parallel to the reference plane 402, for the interconnection of the subset of passageways of the first and second arrays of passageways 412 and 414 that intersect the outer surface 401 of the mixer body 400, as shown in FIGS. 5A & 5E. In operation, the diverter routing groove 430 diverts a flow between the subset of passageways 412 and 414 and thereby prevents the stagnation of flow within these subsets of passageways due to being otherwise obstructed by a flow channel wall 456 within which the static mixers 410 is retained, such as shown in FIG. 7.

The outer cylindrical surface 401 of static mixer 410 arising from the routing grooves 426 and 428 includes residual islands 424 of relatively small surface area on the outer surface 401 of the mixer body 400, generally in proximity to the ends of the mixer body 400 and adjacent the ridges 408, as shown in FIG. 5E. If the static mixer 410 is to be bonded, such as by brazing, into a sleeve or flow channel, the residual islands 424 could have their outer surface diameter reduced, relative to the remaining outside surface 401 of the mixer body 400, to prevent excessive mechanical stress levels. The residual islands 424 may be relieved by turning-down the outside surface 401 of the mixer body 400 about its ends.

Figure 10:
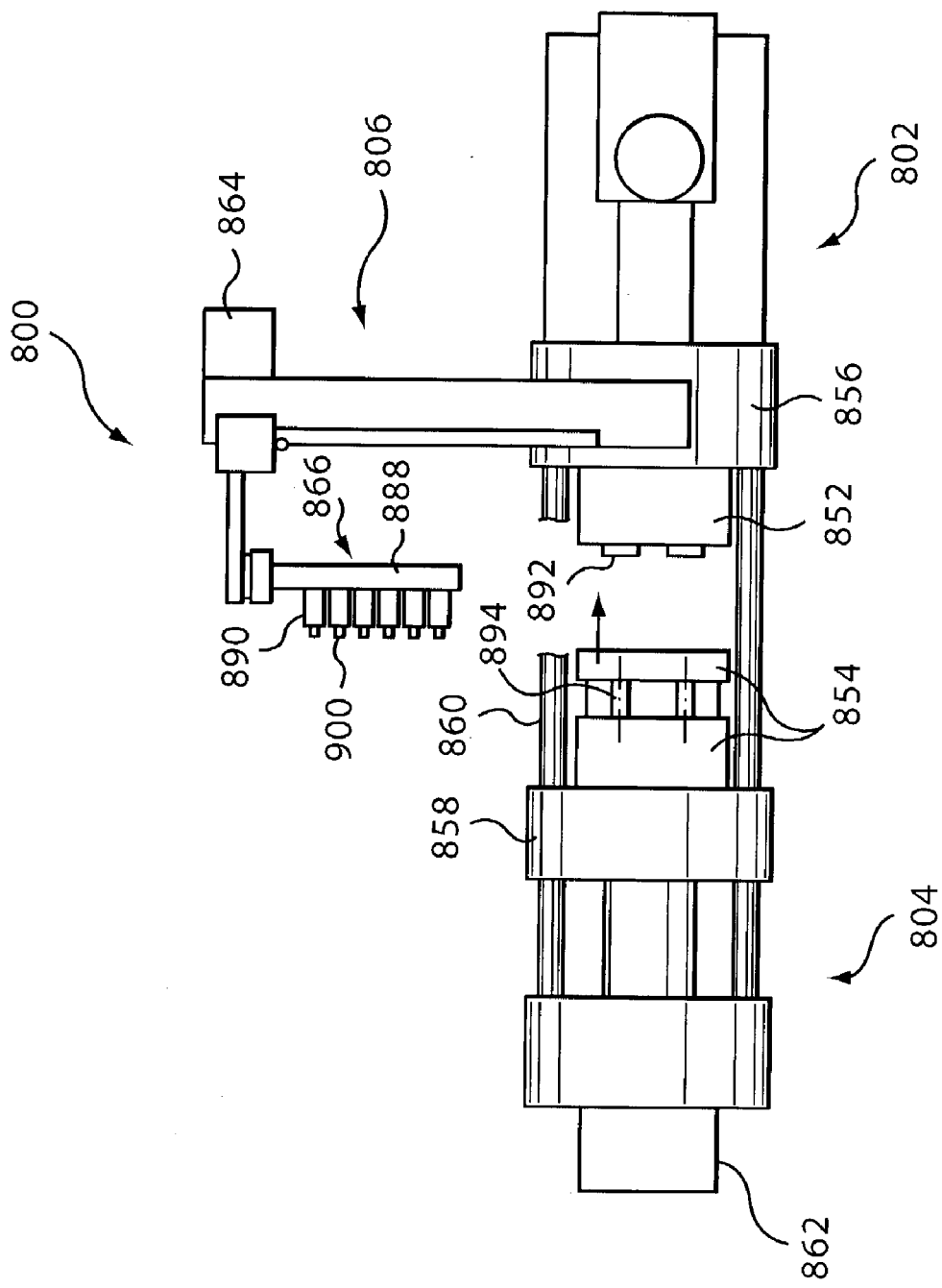
FIG. 10 illustrates a plan view of an injection molding system wherein a static mixer in accordance with an embodiment of the invention may be used.

FIG. 7 illustrates a static mixing assembly 440 that incorporates a stacked arrangement of static mixers 410 according to an embodiment of the present invention. The stacking of multiple static mixers 410 provides improved mixing, especially with a 90° change in relative angular orientation, about their longitudinal axis, between adjacent static mixers 410. With an increase in the number of static mixers there is a corresponding increase in pressure drop, and for an injection molding system it has been established that two to three static mixers 410 is suitable for most homogenizing melts of plastic at a reasonable pressure drop. The orientation of static mixers 410 may be maintained by fastening the mixing elements into a retaining sleeve 450. The sleeve 450 is preferably made from the same material as the static mixer 410, such as to avoid imparting any undue stress on either the static mixer 410 or the bond due to differential thermal expansion. The static mixers 410 may be fastened into the sleeve 450 by vacuum brazed connection 454 along the outer surface 402, and as a bonus the entire assembly is heat-treated in the same step. Alternatively, the static mixers 410 may be fastened through the use of pins 452 that pass through the sleeve 450 and static mixer 410, as shown in FIG. 7. Two pins 452 are used to fasten each static mixer 410, the pins 452 arranged to pass through each static mixer 410 in positions where they interfere the least with the flow passageways 412 and 414. The pins 452 have a diameter less than the diameter the passageways so as to not obstruct the flow therein. The static mixing assembly 440 provides for ease of installation of a stacked array of mixers into a flow channel, such as in an injection molding system as shown in FIG. 10, and as a means for retaining the desired orientation between the mixers of the assembly.

Figure 6A:
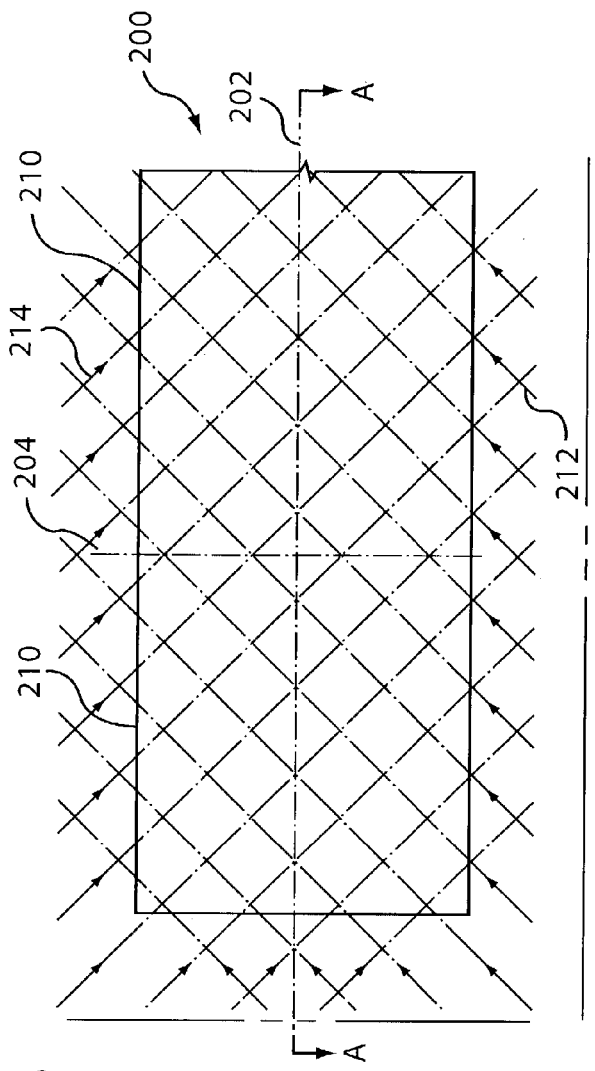
FIGS. 6A, 6B and 6C illustrate the layout pattern for a first and a second array of forming tool path centerlines through an elongate body in accordance with a method for the manufacture of static mixers according to an embodiment of the present invention.
Figure 6B:
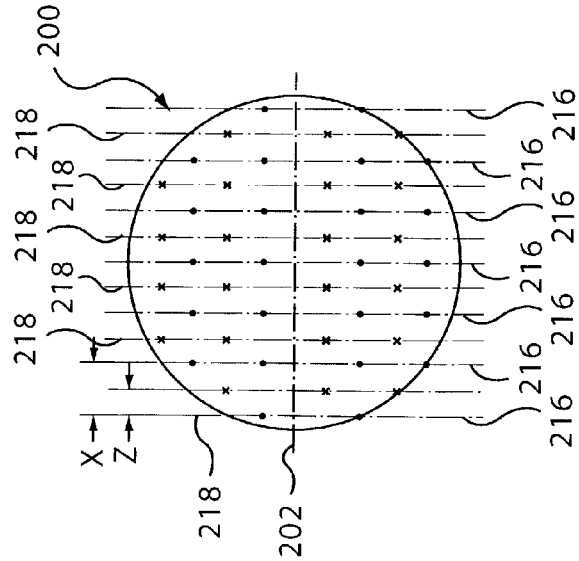
Figure 6C:
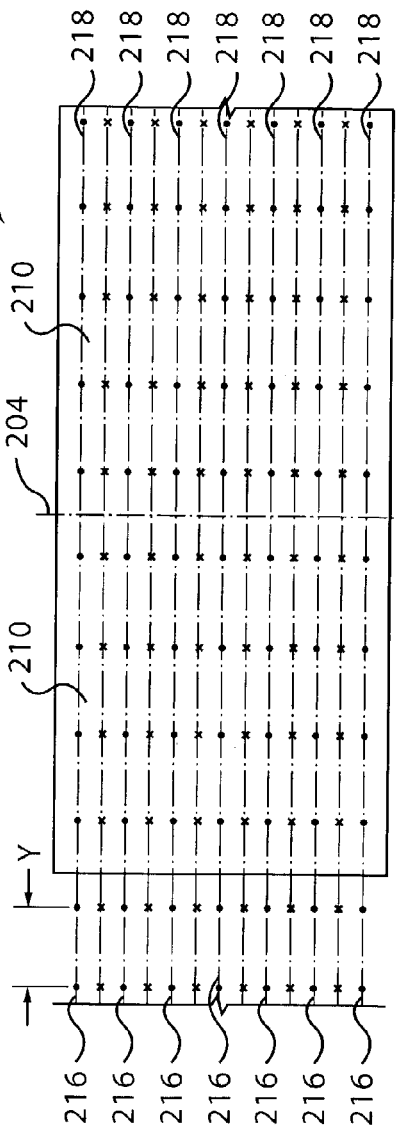

FIGS. 6A, 6B and 6C illustrate a method for the manufacture of static mixers 210 according to an embodiment of the present invention, as shown in FIGS. 4 & 5. In particular, the views represent the way in which flow passageways can be formed in an elongate body 200 to create a first and a second array of intermeshed and interconnected passageways, as shown in FIGS. 4C & 4D. The elongate body is thereafter divided into a plurality of static mixers 210. The elongate body 200 may be made from bar stock of any material, although for use in an injection molding system, cylindrical bar stock made from tool steel, such as AISI H-13, or from INCONEL 718 (nickel alloy), or from other such high-strength materials is a requirement.

A method for manufacturing static mixers simply and inexpensively includes the steps of:

(i) As required, machining the outside surfaces of an elongate body 200 made from bar stock. The outer dimension of the bar stock may need to be machined to provide a static mixer 210 with an outer dimension suitable for installation into a flow passageway, as shown in FIGS. 4C & 4D.

(ii) Forming first and second arrays of intermeshed and interconnected passageways 312 and 314, as shown in FIGS. 4C & 4D, through the elongate body. Preferably, the passageways are formed by means of a forming tool, such as a drill, being driven along a series of inclined forming tool path centerlines 212 and 214 arranged through the elongate body 200. FIGS. 6A, 6B, & 6C illustrate one possible arrangement for a first and a second array of passageway tool path centerlines 212 and 214 arranged through the elongate body 200 along a first set and second set of counter-oriented forming planes 216 and 218 respectively. The forming planes of the first and second sets 216 and 218, as shown in FIG. 6A, are parallel, oriented with the longitudinal axis of the elongate body 200, and intermeshed in a regular-spaced alternating arrangement. The passageway tool path centerlines within an array are oriented on their respective set of forming planes 216 and 218 such that they are mutually parallel and that they pass through the elongated body 200 inclined relative to the longitudinal axis of the elongate body 200. A reference plane 202 bisects the elongate body 200 along its length and oriented perpendicular to the forming planes 216 and 218, as shown in FIGS. 6A & 6B. The passageway tool path centerlines of the first and second arrays 212 and 214 are inclined at opposite angles with respect to the reference plane 202. The passageways tool path centerlines of the first and second arrays 212 and 214 are inclined to the reference plane 202 by an angle $\alpha$ of 45°, although other angles of inclination are perceived, above and below the reference plane 202 respectively, and hence the passageways of the first and second arrays 312 and 314, as shown in FIGS. 4C & 4D, are perpendicular to one another. Further, it can be seen that the first and second arrays of tool path centerlines 212 and 214 intersect the reference plane 202 as substantially identical intermeshed rectangular arrays, as shown in FIG. 6C, the tool path centerlines 212 and 214 of the first and second arrays of passageways piercing the reference plane 202 where marked as 'o' and 'x' respectively. The spacing between the rectangular arrays in a direction perpendicular to the longitudinal axis of the elongate body 200 and along the reference plane 202, that is the spacing between the adjacent forming planes 216 and 218, is about one-half of the array pitch. In other words, the dimension 'Z'='X'/2 relative to 'X', as shown in FIG. 6A, with the tool path centerlines of the first and second arrays 212 and 214 of passageways piercing the end of the elongate body 200 where marked as 'o' and 'x' respectively. The spacing between the rectangular arrays in a direction along the longitudinal axis of the elongate body 200 is substantially equal, that is dimension 'Y' as shown in FIG. 6C. Mixing portals 316, as shown in FIG. 4A, are defined between overlapping passageways of the first and the second array 312 and 314, as shown in FIGS. 4C & 4D. The diameter of each of the passageways 312 and 314 of the first and second arrays, as shown in FIGS. 4C & 4D, are chosen to create mixing portals that have about the same cross-sectional area as the passageways, although other mixing portal sizes are possible. The sequence in the formation of a static mixer according to an embodiment may be as follows:

(a) Forming the first array of passageways 312, as shown in FIGS. 4C & 4D, by drilling through the elongate body 200 along the first array of tool path centerlines 212.

(b) Forming a second array of passageways 314, as shown in FIGS. 4C & 4D, by drilling through the elongate body 200 along the second array of tool path centerlines 214. Conveniently, the elongate body 200 may be reoriented with respect to the forming tool instead of reorienting the forming tool with respect to the elongate body 200, e.g. by flipping the elongate body 200 (e.g. rotating the elongated body through 180° about its longitudinal axis), and then repeating the forming step used for the first array of passageways.

(iii) Optionally, milling routing grooves 426 and 428, as shown in FIG. 5A, to connect the fluid portals 418 and 420 along the flow faces 404. In operation, the routing grooves 426 and 428 prevent the stagnation of a fluid flow across the flow faces 404.

(iv) Optionally, milling diverter routing grooves 430 across the outer surface 401 of the mixer body 400. In operation, the diverter routing grooves 426 and 428 prevent the stagnation of a fluid flow through passageways 412 and 414, as shown in FIG. 7, that would have been otherwise blocked by the flow channel 456 wall within which the static mixer is installed.

(v) Cutting the elongated body 200 across its length, along a cutting plane 204, to form individual static mixers 210.

(vi) Optionally, extrude honing the static mixers 210 to blend the sharp residual edges of the mixing portal 316, as shown in FIG. 4A.

(vii) Optionally, heat treating the static mixers 210. For example, static mixers made from H-13 are preferably hardened to 45–52 HRC.

Figure 8A:
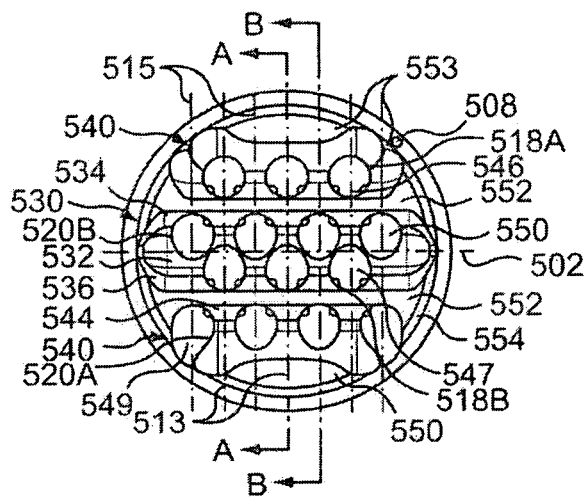
FIGS. 8A, 8B, 8C, 8D, 8E, 8F and 8G illustrate a static mixer in accordance with an embodiment of the present invention that is configured for use in an injection molding system.
Figure 8B:
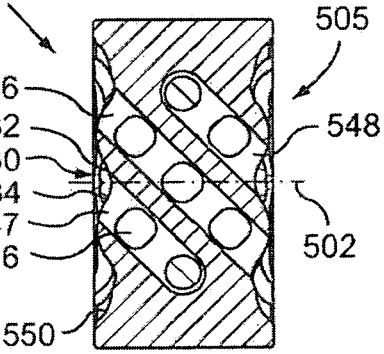
Figure 8C:
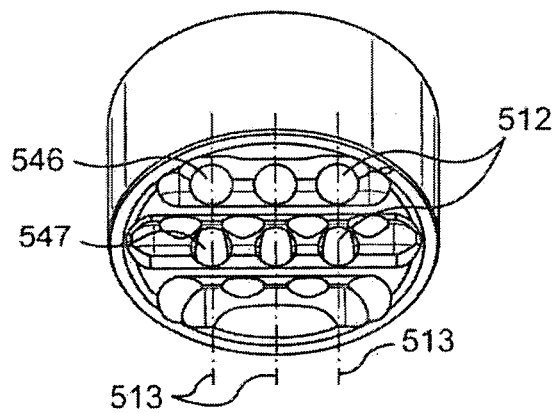
Figure 8D:
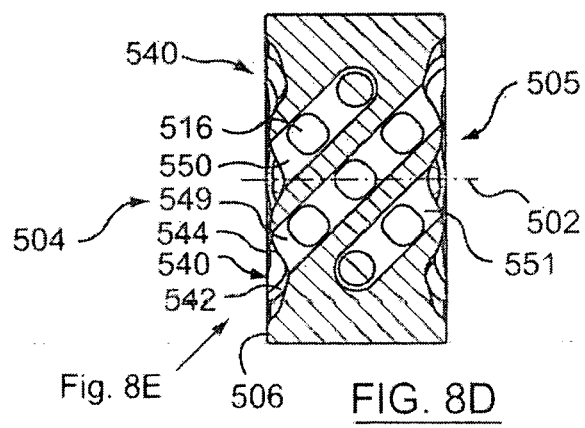

FIGS. 8A, 8B, 8C, 8D, 8E, 8F & 8G illustrate a static mixer 510 according to another embodiment of the invention that may be used in a nozzle adapter assembly of an injection molding system 800, as shown in FIG. 10. The static mixer 510 comprises a cylindrical mixer body 500 with a first and a second array of intermeshed and interconnected passageways 512 and 514 formed therein that, through their interconnection, provide a convoluted flow path between the flow faces 504 at the ends of the mixer body 500. The passageways of the first and second arrays of passageways 512 and 514 are formed in the mixer body 500 with the longitudinal axis of each passageway 512 and 514 being contained along a flow planes of a first and second set 513 and 515 that corresponds to the first and second arrays of passageways respectively. The flow planes of the first and second set 513 and 515 are preferably parallel, perpendicular to a reference plane 502 that bisects the mixer body 500 along its longitudinal axis, oriented with the longitudinal axis of the mixer body 500, and intermeshed in an regular-spaced alternating arrangement. The longitudinal axes of the passageways within each array 512 and 514 are oriented such that, within a particular array, the passageways are substantially mutually parallel. The passageways 512 and 514 are inclined at opposite angles α of 45° from the reference plane 502 and, hence, the passageways 512 and 514 are perpendicular to one another, as shown in FIGS. 8B & 8D. Other angles of inclination are perceived.

With reference to FIGS. 8A, 8B, 8D and 8F, the first and second arrays of passageways 512 and 514 each include three subsets of passageways. In particular, the first subset of passageways 546 and 549 are characterized in that they extend through the mixer body 500 between the flow faces 504. Fluid portals 518 and 520 of the first subset of passageways 546 and 549 extend across the periphery of the flow faces 504 in opposed parallel rows for the first and second arrays of passageways 512 and 514 respectively. The second subset of passageways 547 and 550 are truncated, each passageway extending about half way through the mixer body 500 from a flow face 504 of the mixer body 500. The fluid portals 518 and 520 of the second subset of passageways 547 and 550 extend across the flow face 504 in a pair of closely-spaced rows that stagger the reference plane 502, each row corresponding to the passageways of the first and second arrays respectively, and are parallel to the rows of fluid portals from the first subset of passageways. Similarly, the third subset of passageways 548 and 551 are also truncated, each passageway extending about half way through the mixer body 500 from a flow face 504 of the mixer body 500 that is on the opposite end of the mixer body 500 relative to the flow face 504 from which the second subset of passageways 547 and 550 extend. The fluid portals 518 and 520 of the third subset of passageways 547 and 550 extend across the opposed flow face 504 in a pair of closely-spaced rows that stagger the reference plane 502, each row corresponding to the passageways of the first and second arrays respectively, and are parallel to the rows of fluid portals from the first subset of passageways. Preferably, the passageways of the first and second arrays 512 and 514 are formed as straight cylindrical bores of a substantially constant and equal diameter. The diameter of the passageways 512 and 514 is such that the boundaries of adjacent intermeshed passageways 512 and 514, of the first and second arrays, overlap to form mixing portals 516 for interconnecting the passageways, as shown in FIGS. 8B & 8D. The mixing portals 516 have about the same cross-sectional area as the passageways 512 and 514. Again with reference to FIGS. 8B & 8D, the passageways of the second and third subsets 547, 550, 548, and 551 respectively, have a spherical-shaped end, such as would be formed by a ball-nosed forming tool, in operation directing the melt to be mixed through the mixing portal 516 adjacent the spherical-shaped end without creating any areas in which the viscous melt could stagnate.

With reference to FIGS. 8A, 8B & 8D, it can be seen that both flow faces 504 are located at the ends of the mixer body 500, and that each flow face 504 is recessed and intricately contoured for the purposes of directing the entire incoming melt flow field into the passageways 512 and 514 and to ensure that there is unfettered flow between adjacent flow faces 504 of stacked static mixers 510. Referring also FIG. 8G, as previously mentioned, each flow face 504 includes a recessed face 552 covering a substantial central portion of the end of the mixer body 500 at a uniform shallow depth, and a tapered face 554 of a narrow annular shoulder 505 that tapers inwardly between an annular bearing surface 506, atop of the annular shoulder 505, and the recessed face 552. Each flow face 504 further includes routing grooves 530 and 540 that connect the fluid portals 518 and 520 across the rows of passageways within each subset, and assist in operation by directing the fluid flow towards the passageways 512 and 514. Each row of fluid portals 518 and 520 of the first subset of each array of passageways 546 and 549, along each flow face 504, are connected by a lateral routing groove 540 that extends across the recessed face 552. The lateral routing groove 540 has a rounded profile 542 with semi-spherical ends that blends into the tapered face 544 adjacent the annular shoulder 505. Each flow face 504 further includes a radial spherical routing groove 553, formed through the recessed face 552, extending between the ends of the lateral routing groove 540 along a path that is tangential with the tapered face 554 of the annular shoulder 505 and is adjacent the outside edge of the lateral groove 540. The radial spherical routing groove 553 is further blended into the lateral routing groove 540 by a tapered face 544 that extends along the outside edge of the lateral groove 540 and is tapered inwardly towards the center thereof. The fluid portals 518 and 520 of each of the second and third subsets 547, 550, 548, and 551 of the first and second arrays of passageways 512 and 514 are connected by a medial routing groove 530, along the first and second flow faces (504) respectively, which extends across the recessed face 552. The medial routing groove 530 has a rounded profile 542 with semi-spherical ends that blends into the tapered face 554 adjacent the annular shoulder 505. The medial routing groove 530 is blended into the recessed face 552, along both sides of the groove, by tapered faces 534 that extend along the edges of the lateral groove and are tapered inwardly towards the center thereof.

Figure 8G:
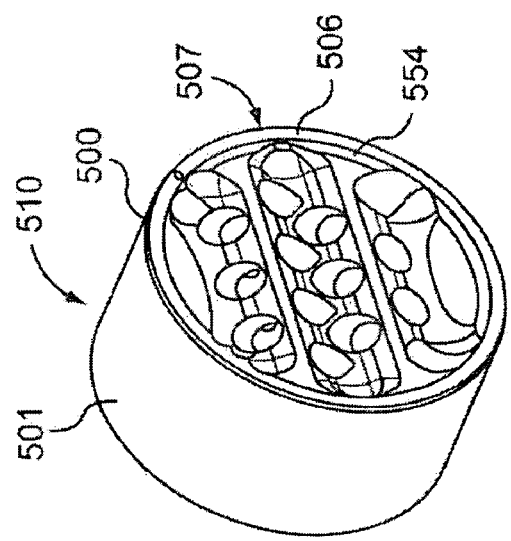
Figure 8F:
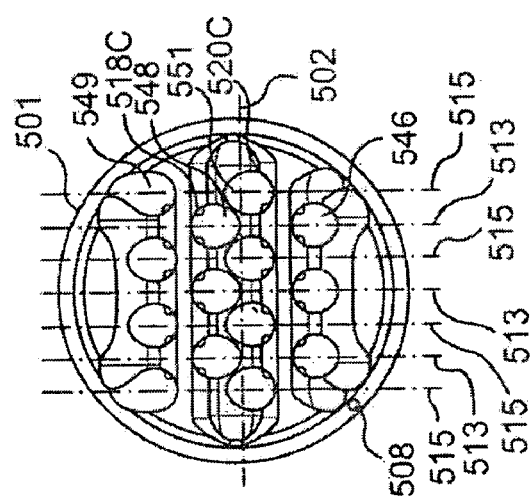
Figure 8E:
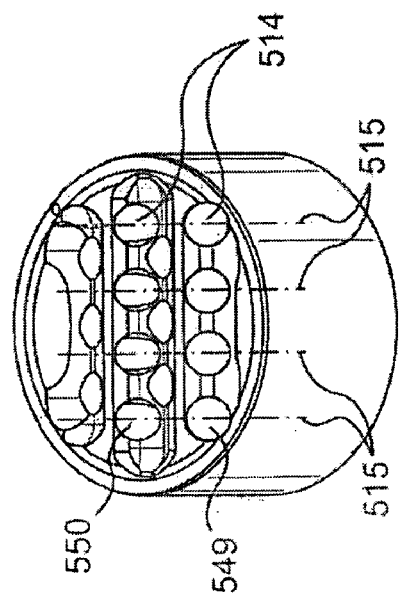

With reference to FIGS. 8A & 8F, it can be seen that for the sake of stacking static mixers 510, an alignment hole 508 is provided through the bearing surface 506 of the annular shoulder 505 on both sides of the mixer body 500. The alignment hole 510 preferably receives an alignment element, such as a spring pin. The alignment holes 508 on opposing flow faces 504 are preferably rotationally displaced by 90° and thereby provide for relative alignment between stacked static mixers 510 such that the flow planes 513 and 515 of adjacent static mixers 510 are maintained perpendicular to one another for improved mixing performance.

Figure 11:
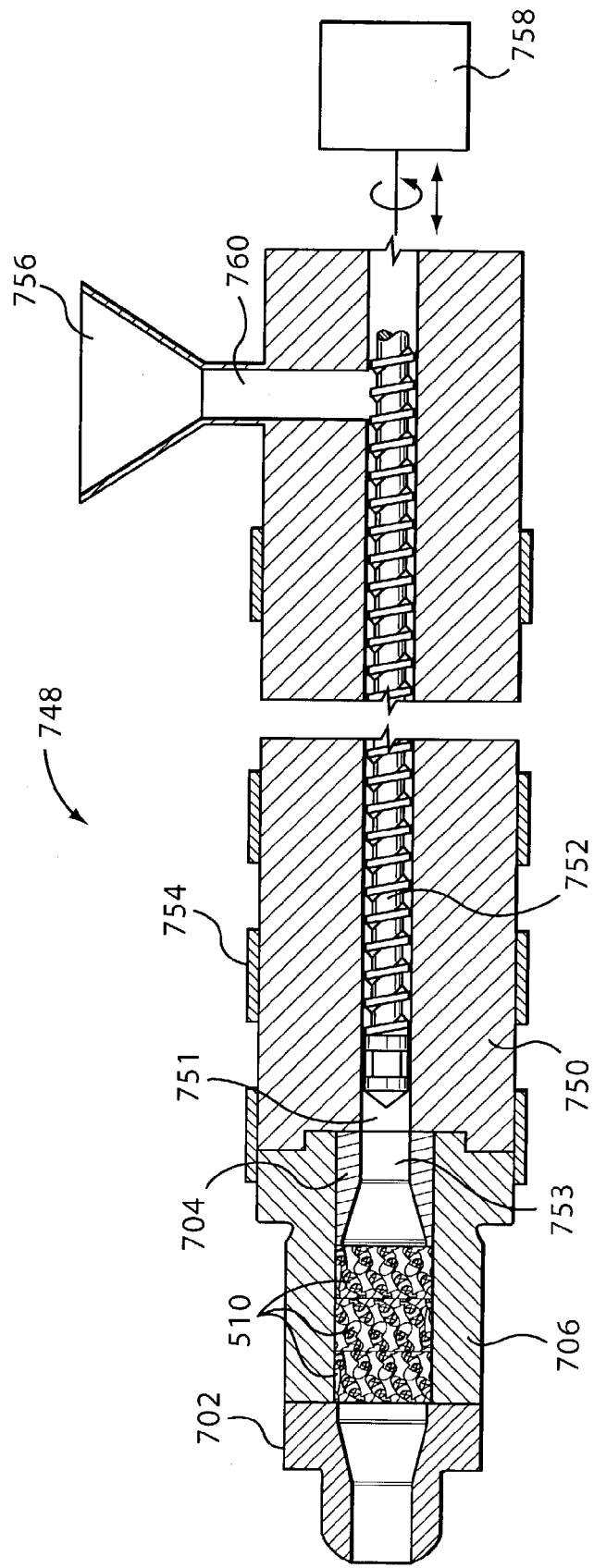
FIG. 11 illustrates a section view through a barrel assembly of an injection molding system that includes a nozzle adapter assembly that incorporates a static mixer in accordance with an embodiment of the invention.
Figure 12:
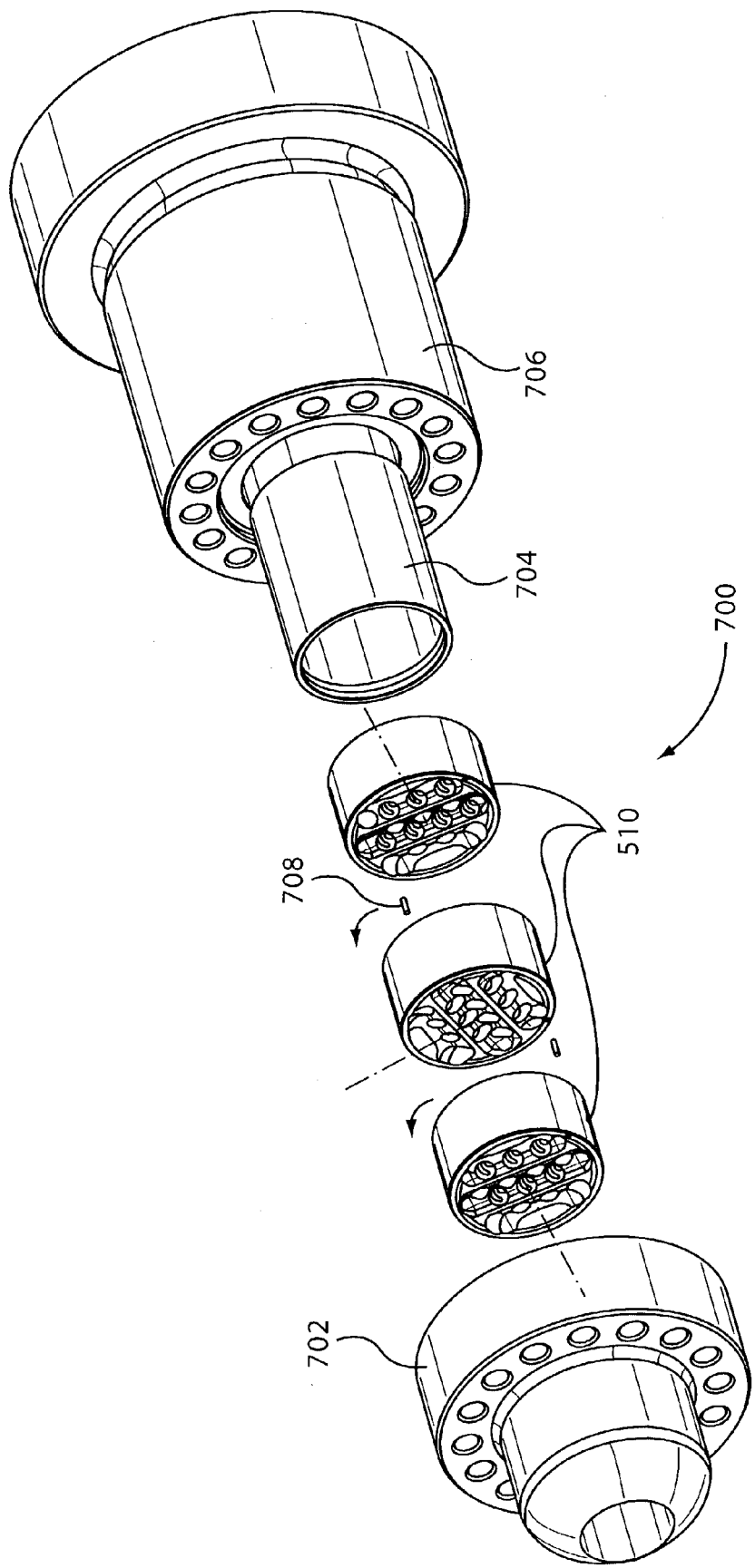
FIG. 12 illustrates an exploded assembly view of a nozzle adapter assembly that incorporates a static mixer in accordance with an embodiment of the invention.

With reference to FIG. 8G, the outer cylindrical surface 501 of the mixer body 500 may be used to align and retain the static mixer 510 in a melt flow channel of the injection molding system 800, as shown in FIG. 10, and that the bearing surface 506 of the annular shoulder 505 provides a mating surface that may be used between stacked static mixers 510, as shown in FIGS. 11 & 12, or with a retaining structure that is a part of the injection molding system 800 as will be described hereinafter.

To provide a cylindrical mixer body 500 with the optimal mechanical properties required to operate at typical operating pressures in an injection molding system 800 over an extended period, it is preferable to machine the static mixer 510 from bar stock, such as AISI H-13 tool steel or INCONEL 718 superalloy, that is then preferably heat-treated to achieve a hardness of 43–55 and 44–46 HRC respectively. It has also been found that by extrude honing static mixer 510, all sharp edges along the flow faces 504 and along the mixing portals 516 can be removed and thereby reduce mechanical stress risers that could otherwise exceed the yield strength of the materials and contribute to premature failure.

Figure 9:
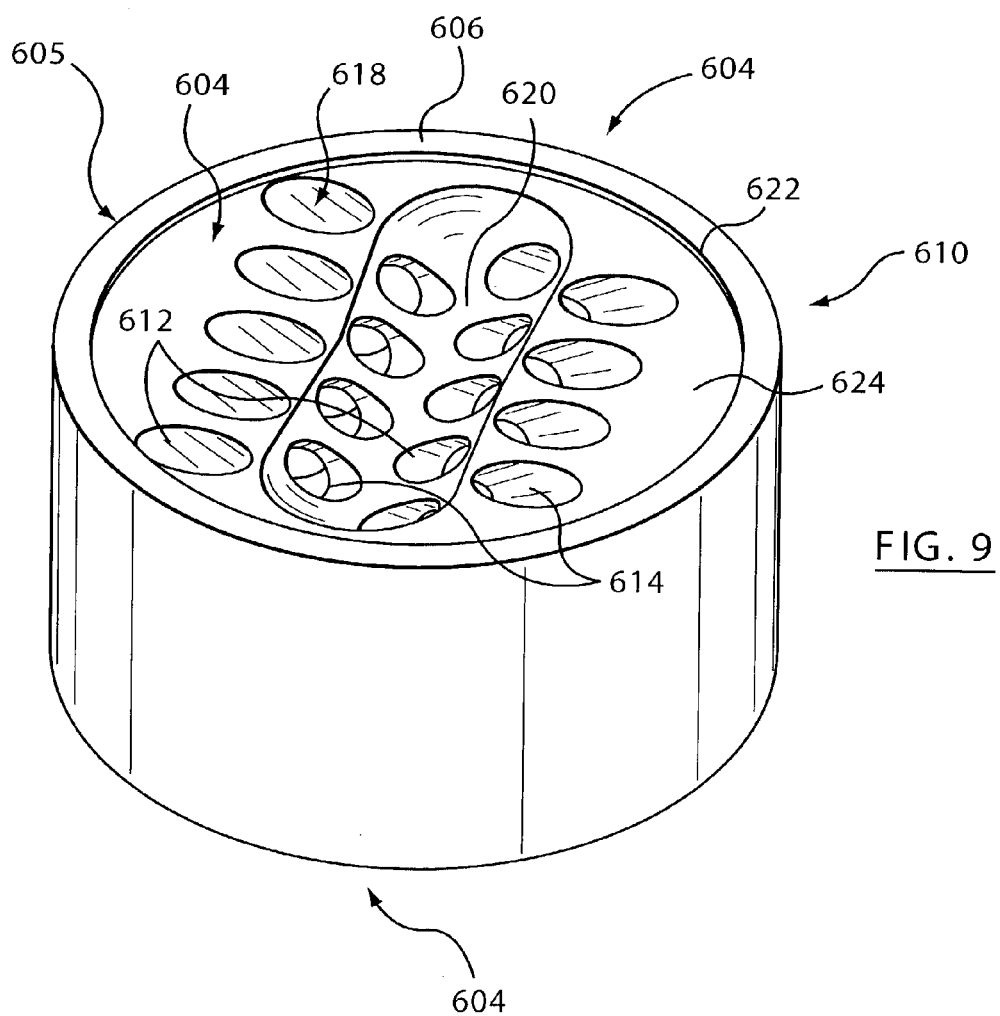
FIG. 9 illustrates an isometric view of a static mixer in accordance with an embodiment of the present invention.

FIG. 9 illustrates static mixer 610 according to an alternative embodiment of the invention. The static mixer 610 is similar to the previous embodiment, as shown in FIGS. 8A–8G, the exception being that the flow faces 604 have an alternative configuration. Despite the alternative configuration, the flow faces 604 serve the same function as previously described. Each flow face 604 includes a recessed conical face 624 covering a substantial central portion of the end of the mixer body 600, the conical face 624 has an inward taper towards the center of the flow face 604 at a shallow angle, and is recessed at a shallow depth relative to the bearing surface 606 of a narrow annular shoulder 605 that surrounds the flow face 604. Each flow face 604 further includes a medial routing groove 620 that extends across the recessed conical face 624 to connect the fluid portals 618 of the second and third subsets of the first and second arrays of passageways 612 and 614 across the first and second flow faces (604) respectively. The medial routing groove 620 has a rounded profile with semi-spherical ends.

The static mixers of the present invention have particular utility in a typical injection molding system 800, as shown in FIG. 10 comprising an injection unit 802, an injection mold clamp unit 804, and a molded article handling and conditioning system 806. In operation, a singular melt flow is initially divided at the first flow face 104 of the static mixer 110, wherein the melt flow divides into the intermeshing passageways 112 and 114 and further divides and re-combines at the locations of mixing portals 116 before exiting the static mixer 110 at the second flow face 104 as homogenized melt.

The injection unit 802 arranged to provide a controlled flow of pressurized molten plastic in a known manner. For example, the injection unit includes a barrel assembly 748, as shown in FIG. 11, operable such that plastic resin entering the barrel assembly 748 at the feed throat 760 is heated and pressurized by a rotating screw 752, with supplemental heat provided by barrel heaters 754, the melt thereafter injected through a nozzle 702, into an adjacent injection mold formed by mold half 852 and 854, as shown in FIG. 10, by reciprocation of the screw 752. The screw 752 is rotated and typically reciprocated by a screw drive 758. The barrel assembly 748 of FIG. 11 further includes a nozzle adapter assembly 700, as shown in FIG. 12, which receives a set of static mixers 510 according to an embodiment of the present invention. The nozzle adapter assembly 700 further comprises a nozzle adapter 706 and a nozzle tip 702 fastened at an end thereof, wherein the nozzle adapter assembly 700 provides a connection between a barrel 750 of the barrel assembly 748 with a sprue of an injection mold runner system (not shown), as is commonly known. The nozzle adapter 706 has a tubular body, the bore therein for receiving the static mixers 510 about their outer surface 501, the bore also provides a flow channel 753 that connects the barrel bore 751 with the flow channel 753 of the annular nozzle tip. The static mixers 510 may be advantageously aligned with the flow planes of adjacent static mixers 513 and 515 oriented at 90° to one another, rotated about the longitudinal axes of the static mixers 510, and are maintained in the desired orientation through the use of alignments pins 708 that interface alignment holes 508 provided on the static mixers 510. The static mixers 510 are positioned and retained along the bore of the nozzle adapter 706 between a shoulder of the nozzle tip 702, the shoulder provided by an end face of the nozzle tip 702 that extends into the flow channel of the nozzle adapter 706, and a tubular spacer 704 that also forms a part of the nozzle adapter assembly 700, the tubular spacer 704 itself received and retained in the bore of the nozzle adapter 706 by an end face of the barrel 750 that extends into the bore of the nozzle adapter 706. The nozzle tip 702 is preferably made from AISI H-13 tool steel, the nozzle adapter 706 from AISI 4140 steel, the spacer from ASTM 316 stainless steel.

The injection-molding clamp unit 804 includes: a fixed platen 856 with a first mold half 852 mounted thereon; a movable platen 858 with a second mold half 854 mounted thereon, the moving platen 858 operable to move the second mold half 854 between a mold open and mold closed position by means of stroke cylinders (not shown) or the like; a clamping means that includes tie bars 860 and a clamping mechanism 862 and which generates a mold clamp force in a known manner. The first mold half 852 typically includes a runner system (not shown), such as a hot runner as generally known, operable to distribute a flow of molding material received from the machine nozzle 702 to each of the mold cavities 892 and 894 defined between the mold halves 852 and 854 respectively.

The molded article handling and conditioning system 806 includes a robot 864 that carries a carrier plate assembly 866. For an injection molding system 800 for the production of preforms 900, the carrier plate assembly 866 typically includes a take-out plate 888 with a set of preform cooling tubes 890 configured for handling and conditioning of the molded preforms 900.

It is to be understood that the static mixers of the present invention may be used anywhere in the melt flow path of an injection molding system 800 as is commonly known. It is contemplated that the static mixers of the present invention could also prove advantageous when used in the runner system of the injection mold 850, especially when located adjacent and upstream of a melt channel split.

It will, of course, be understood that the above description has been given by way of example only and that modifications in detail may be made within the scope of the present invention. For example: first and second arrays could also be interconnected as a distinct series of intermeshed and interconnected passageways rather than a matix. For another example, a third array of passageways may be formed in the mixer body that intermesh and interconnect the passageways of the first and second arrays. For yet another example, the passageways could also be formed as interconnected helixes, or as passageways with substantially straight longitudinal axes but with a helical outer form.]

The foregoing embodiments of the static mixer according to the present invention include passageways of the first and second arrays that are completely interconnected as a matrix. However, it is contemplated that the passageways of the first and second arrays could also be interconnected as a distinct series of intermeshed and interconnected passageways.

The foregoing embodiments of the static mixer include mixing portals that are defined at the overlap between the boundaries of adjacent passageways of the first and second arrays. However, it is contemplated that the passageways of the first and second arrays could also be interconnected through the use of distinct connection passageways. For example, a third array of passageways may be formed in the mixer body that intermesh and interconnect the passageways of the first and second arrays.

The foregoing embodiments of the static mixer include passageways that are formed as straight cylindrical bores of a substantially constant and equal diameter. However, it is contemplated that the passageways could also be formed as interconnected helixes, or as passageways with substantially straight longitudinal axes but with a helical outer form.

Thus, what has been described is a static mixer for the homogenization of viscous fluids and also to uses of such a device in an injection molding system.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A static mixer for use in a melt flow channel of an injection molding system, said static mixer comprising:
   a mixer body (500);
   a first flow face (504) configured at an end of said mixer body (500);
   a second flow face (505) configured at an opposite end of said mixer body (500) from said first flow face (504);
   an outer surface (501) configured around the mixer body (500) between the ends thereof;
   a plurality of first passageways (512) configured in said mixer body (500);
   a plurality of second passageways (514) configured in said mixer body (500);
   said plurality of first and second passageways (512, 514) configured to extend along substantially straight longitudinal axes;
   said plurality of first and second passageways (512,514) being arranged into a first and a second array, respectively, said arrays being intermeshed and interconnected to configure a plurality of mixing portals (516) between said first and second passageways (512, 514);
   said first and second arrays of passageways (512, 514) including:
   a first subset of passageways (546, 549) each passageway of which extend between the flow faces (504, 505) with a corresponding plurality of fluid portals (518, 520) being configured along each flow face (504, 505);
   a second subset of passageways (547, 550) each passageway of which extend about half way through the mixer body (500) from the first flow face (504), without opening to the outer surface (501) of the mixer body (500), with a corresponding plurality of fluid portals (518, 520) being configured along the first flow face (504);
   a third subset of passageways (548, 551) each passageway of which extend about half way through the mixer body (500) from the second flow face (505), without opening to the outer surface (501) of the mixer body (500), with a corresponding plurality of fluid portals (518, 520) being configured along the second flow face (505);
   an end of each passageway of said second and third subset (547, 550), (548, 551) being enclosed within said mixer body (500) and having a mixing portal (516) defined therebetween;
   whereby said plurality of intermeshed and interconnected first and second passageways (512, 514) provide a convoluted flow path between said flow faces (504, 505).

2. The static mixer of claim 1, wherein said first array of passageways are arranged with the longitudinal axes of said first passageways (512) disposed along one of a first set of flow planes (513), and the second array of passageways are arranged with the longitudinal axes of said second passageways (514) disposed along one of a second set of flow planes (515).

3. The static mixer of claim 2, wherein the first and second sets of flow planes (513 and 515) are parallel, perpendicular to a reference plane (502) that bisects the mixer body (500) along its longitudinal axis, oriented with the longitudinal axis of the mixer body (500), and intermeshed in an regular-spaced alternating arrangement.

4. The static mixer of claim 3, wherein the first and second passageways (512 and 514) inclined relative to each other.

5. The static mixer of claim 4, wherein the longitudinal axes of the passageways (512 and 514) within an array are oriented on their respective flow planes (513 and 515) such that the passageways are mutually parallel.

6. The static mixer of claim 5, wherein the passageways of the first and second arrays (512 and 514) are inclined at opposite angles with respect to the reference plane (502).

7. The static mixer of claim 6, wherein the opposite angle is 45 degrees.

8. The static mixer of claim 5, wherein the passageways (312 and 314) are formed as straight cylindrical bores of a constant and equal diameter.

9. The static mixer of claim 8, wherein the mixing portals (516) have the same cross-sectional area as the passageways (512 and 514).

10. The static mixer of claim 9, wherein an array pitch of the first and second arrays is identical.

11. The static mixer of claim 10, wherein relative spacing between adjacent flow planes (513 and 515), of the first and second set, is about one-half of the spacing of the array pitch.

12. The static mixer of claim 11, wherein the mixer body (500) is cylindrical with ends providing the flow faces (504, 505).

13. The static mixer of claim 1, wherein the plurality fluid portals (518 and 520) of the first subset of passageways (546 and 549) extend across the periphery of the flow faces (504, 505) in opposed parallel rows for the first and second arrays of passageways (512 and 514) respectively.

14. The static mixer of claim 13, wherein the plurality fluid portals (518 and 520) of the second subset of passageways (547 and 550) extend across the first flow face (504) in a pair of closely-spaced rows that stagger the reference plane 502, each row corresponding to the passageways of the first and second arrays (512 and 514) respectively, and are parallel to the rows of fluid portals from the first subset of passageways.

15. The static mixer of claim 14, wherein the plurality fluid portals (518 and 520) of the third subset of passageways (548 and 551) extend across the second flow face (505) in a pair of closely-spaced rows that stagger the reference plane 502, each row corresponding to the passageways of the first and second arrays (512 and 514) respectively, and are parallel to the rows of fluid portals from the first subset of passageways.

16. The static mixer of claim 15, wherein the passageways (512 and 514) are formed as straight cylindrical bores of a constant and equal diameter.

17. The static mixer of claim 16, wherein the mixing portals (516) have the same cross-sectional area as the passageways (512 and 514).

18. The static mixer of claim 13 wherein an alignment hole (508) is provided through the bearing surface (506) of the annular shoulder (507) on both sides of the mixer body (500).

19. The static mixer of claim 18, wherein the alignment holes (508) on opposing flow faces (504, 505) are rotationally displaced by 90°.

20. The static mixer of claim 1, wherein each flow face (504, 505) includes a recessed face (552) covering a substantial central portion of the end of the mixer body (500) at a uniform shallow depth, an annular shoulder (507) with a bearing surface (506) atop the annular shoulder (507) and a tapered face (554) that tapers inwardly and extends between the bearing surface (506) and the recessed face (552).

21. The static mixer of claim 20, further comprising a plurality of routing grooves (530 and 540) that extend across the flow faces (504, 505) to connect the fluid portals (518 and 520) along each row thereof.

22. The static mixer of claim 21, wherein the fluid portals (518 and 520) along each row of the first subset of passageways (546 and 549) are connected by a plurality of lateral routing grooves (540).

23. The static mixer of claim 22, wherein each lateral routing groove (540) has a rounded profile 542 with semi-spherical ends that blends into the tapered face (544).

24. The static mixer of claim 23, wherein each flow face (504, 505) further includes a radial spherical routing groove (553), formed through the recessed face (552), that extends between the ends of the lateral routing groove (540) along a path that is tangential with the tapered face (554) and is adjacent the outside edge of the lateral routing groove (540).

25. The static mixer of claim 24, wherein the radial spherical routing groove (553) is further blended into the lateral routing groove (540) by a tapered face (544) that extends along the outside edge of the lateral groove (540) and is tapered inwardly towards the center thereof.

26. The static mixer of claim 25, wherein the fluid portals (518 and 520) of the second and third subsets of passageways (547, 550, 548, and 551) are connected, along the first and second flow faces (504, 505) respectively, by a medial routing groove (530).

27. The static mixer of claim 26 wherein each medial routing groove (530) has a rounded profile (542) with semi-spherical ends that blends into the tapered face (544).

28. The static mixer of claim 27 wherein the medial routing groove (530) is blended into the recessed face (552), along both sides of the groove, by tapered faces (534) that extend along the edges of the lateral groove and are tapered inwardly towards the center thereof.

29. The static mixer of claim 1, wherein each flow face (504, 505) includes a conical face (624) covering a substantial central portion of the end of the mixer body (600), the conical face (624) has an inward taper towards the center of the flow face (604, 605) at a shallow angle, and is recessed at a shallow depth relative to the bearing surface (606) of a narrow annular shoulder (607) that surrounds the flow face (604, 605).

30. The static mixer of claim 29, wherein each flow face (604, 605) further includes a medial routing groove (620) that extends across the recessed conical face (624) to connect the fluid portals of the second and third subsets (547, 548, 550, and 551) of the first and second arrays of passageways (612 and 614) across the first and second flow faces (604) respectively.

31. The static mixer of claim 30, wherein each medial routing groove (630) has a rounded profile (642) with semi-spherical ends.

32. The static mixer of claim 1, wherein the mixer is configured to be arranged in a nozzle adapter assembly (700) having a flow channel (753) extending through it, the nozzle adapter assembly (700) providing a connection between a barrel (750) and a sprue of an injection mold runner system in an injection molding system (800).

33. The static mixer of claim 1, configured to be arranged in a runner system of an injection mold (850).

34. The static mixer of claim 1, wherein the first and second passageways are interconnected as a distinct series of intermeshed and interconnected passageways.

35. The static mixer of claim 1, wherein the mixing portal is a connection passageway.

36. The static mixer of claim 1, wherein the passageways are formed as interconnected helixes.

37. The static mixer of claim 1, wherein the passageways are formed with straight longitudinal axes but with a helical outer form.

38. An injection molding system including a static mixer configured in a melt channel thereof, the static mixer comprising:
- a mixer body (500);
- a first flow face (504) configured at an end of said mixer body (500);
- a second flow face (505) configured at an opposite end of said mixer body (500) from said first flow face (504);
- an outer surface (501) configured around the mixer body (500) between the ends thereof;
- a plurality of first passageways (512) configured in said mixer body (500);
- a plurality of second passageways (514) configured in said mixer body (500);
- said plurality of first and second passageways (512, 514) configured to extend along substantially straight longitudinal axes;
- said plurality of first and second passageways (512, 514) being arranged into a first and a second array, respectively, said arrays being intermeshed and interconnected to configure a plurality of mixing portals (516) between said first and second passageways (512, 514);
- said first and second arrays of passageways (512, 514) including:
- a first subset of passageways (546, 549) each passageway of which extend between the flow faces (504, 505) with a corresponding plurality of fluid portals (518, 520) being configured along each flow face (504, 505);
- a second subset of passageways (547, 550) each passageway of which extend about half way through the mixer body (500) from the first flow face (504), without opening to the outer surface (501) of the mixer body (500), with a corresponding plurality of fluid portals (518, 520) being configured along the first flow face (504);
- a third subset of passageways (548, 551) each passageway of which extend about half way through the mixer body (500) from the second flow face (505), without opening to the outer surface (501) of the mixer body (500), with a corresponding plurality of fluid portals (518, 520) being configured along the second flow face (505);
- an end of each passageway of said second and third subset (547, 550), (548, 551) being enclosed within said mixer body (500) and having a mixing portal (516) defined therebetween; whereby said plurality of intermeshed and interconnected first and second passageways (512, 514) provide a convoluted flow path between said flow faces (504, 505).

39. The injection molding system of claim 38, wherein said first array of passageways are arranged with the longitudinal axes of said first passageways (512) disposed along one of a first set of flow planes (513), and the second array of passageways are arranged with the longitudinal axes of said second passageways (514) disposed along one of a second set of flow planes (515).

40. The injection molding system of claim 39, wherein the first and second sets of flow planes (513 and 515) are parallel, perpendicular to a reference plane (502) that bisects the mixer body (500) along its longitudinal axis, oriented with the longitudinal axis of the mixer body (500), and intermeshed in an regular-spaced alternating arrangement.

41. The injection molding system of claim 40, wherein the first and second passageways (512 and 514) inclined relative to each other.

42. The injection molding system of claim 41, wherein the longitudinal axes of the passageways (512 and 514) within an array are oriented on their respective flow planes (513 and 515) such that the passageways are mutually parallel.

43. The injection molding system of claim 42, wherein the passageways of the first and second arrays (512 and 514) are inclined at opposite angles with respect to the reference plane (502).

44. The injection molding system of claim 43, wherein the opposite angle is 45 degrees.

45. The injection molding system of claim 42, wherein the passageways (312 and 314) are formed as straight cylindrical bores of a constant and equal diameter.

46. The injection molding system of claim 45, wherein the mixing portals (516) have the same cross-sectional area as the passageways (512 and 514).

47. The injection molding system of claim 46, wherein an array pitch of the first and second arrays is identical.

48. The injection molding system of claim 47, wherein relative spacing between adjacent flow planes (513 and 515), of the first and second set, is about one-half of the spacing of the array pitch.

49. The injection molding system of claim 48, wherein the mixer body (500) is cylindrical with ends providing the flow faces (504, 505).

50. The injection molding system of claim 38, wherein the plurality fluid portals (518 and 520) of the first subset of passageways (546 and 549) extend across the periphery of the flow faces (504, 505) in opposed parallel rows for the first and second arrays of passageways (512 and 514) respectively.

51. The injection molding system of claim 50, wherein the plurality fluid portals (518 and 520) of the second subset of passageways (547 and 550) extend across the first flow face (504) in a pair of closely-spaced rows that stagger the reference plane 502, each row corresponding to the passageways of the first and second arrays (512 and 514) respectively, and are parallel to the rows of fluid portals from the first subset of passageways.

52. The injection molding system of claim 51, wherein the plurality fluid portals (518 and 520) of the third subset of passageways (548 and 551) extend across the second flow face (505) in a pair of closely-spaced rows that stagger the reference plane 502, each row corresponding to the passageways of the first and second arrays (512 and 514) respectively, and are parallel to the rows of fluid portals from the first subset of passageways.

53. The injection molding system of claim 52, wherein the passageways (512 and 514) are formed as straight cylindrical bores of a constant and equal diameter.

54. The injection molding system of claim 53, wherein the mixing portals (516) have the same cross-sectional area as the passageways (512 and 514).

55. The injection molding system of claim 50 wherein an alignment hole (508) is provided through the bearing surface (506) of the annular shoulder (507) on both sides of the mixer body (500).

56. The injection molding system of claim 55, wherein the alignment holes (508) on opposing flow faces (504, 505) are rotationally displaced by 90°.

57. The injection molding system of claim 38, wherein each flow face (504, 505) includes a recessed face (552) covering a substantial central portion of the end of the mixer body (500) at a uniform shallow depth, an annular shoulder (507) with a bearing surface (506) atop the annular shoulder (507) and a tapered face (554) that tapers inwardly and extends between the bearing surface (506) and the recessed face (552).

58. The injection molding system of claim 57, further comprising a plurality of routing grooves (530 and 540) that extend across the flow faces (504, 505) to connect the fluid portals (518 and 520) along each row thereof.

59. The injection molding system of claim 58, wherein the fluid portals (518 and 520) along each row of the first subset of passageways (546 and 549) are connected by a plurality of lateral routing grooves (540).

60. The injection molding system of claim 59, wherein each lateral routing groove (540) has a rounded profile 542 with semi-spherical ends that blends into the tapered face (544).

61. The injection molding system of claim 60, wherein each flow face (504, 505) further includes a radial spherical routing groove (553), formed through the recessed face (552), that extends between the ends of the lateral routing groove (540) along a path that is tangential with the tapered face (554) and is adjacent the outside edge of the lateral routing groove (540).

62. The injection molding system of claim 61, wherein the radial spherical routing groove (553) is further blended into the lateral routing groove (540) by a tapered face (544) that extends along the outside edge of the lateral groove (540) and is tapered inwardly towards the center thereof.

63. The injection molding system of claim 62, wherein the fluid portals (518 and 520) of the second and third subsets of passageways (547, 550, 548, and 551) are connected, along the first and second flow faces (504, 505) respectively, by a medial routing groove (530).

64. The injection molding system of claim 63 wherein each medial routing groove (530) has a rounded profile (542) with semi-spherical ends that blends into the tapered face (544).

65. The injection molding system of claim 64 wherein the medial routing groove (530) is blended into the recessed face (552), along both sides of the groove, by tapered faces (534) that extend along the edges of the lateral groove and are tapered inwardly towards the center thereof.

66. The injection molding system of claim 38, wherein each flow face (504, 505) includes a conical face (624) covering a substantial central portion of the end of the mixer body (600), the conical face (624) has an inward taper towards the center of the flow face (604, 605) at a shallow angle, and is recessed at a shallow depth relative to the bearing surface (606) of a narrow annular shoulder (607) that surrounds the flow face (604, 605).

67. The injection molding system of claim 66, wherein each flow face (604, 605) further includes a medial routing groove (620) that extends across the recessed conical face (624) to connect the fluid portals of the second and third subsets (547, 548, 550, and 551) of the first and second arrays of passageways (612 and 614) across the first and second flow faces (604) respectively.

68. The injection molding system of claim 67, wherein each medial routing groove (630) has a rounded profile (642) with semi-spherical ends.

69. The injection molding system of claim 38, wherein the mixer is arranged in a nozzle adapter assembly (700) having a flow channel (753) extending through it, the nozzle adapter assembly (700) providing a connection between a barrel (750) and a sprue of an injection mold runner system in an injection molding system (800).

70. The injection molding system of claim 69, wherein the nozzle adapter assembly (700) comprises a tubular nozzle adapter (706) with a bore therein adapted to receive at least one static mixer (510), and an annular nozzle tip (702) fastened to an end of the nozzle adapter (706).

71. The injection molding system of claim 70, wherein the nozzle adapter assembly (700) includes a stacked set of static mixers (510) that are kept mutually aligned with alignments pins (708) received in alignment holes (508) provided on the static mixers (510).

72. The injection molding system of claim 71, wherein adjacent static mixers (510) in the nozzle adapter assembly (700) have a relative angular orientation of 90° about their longitudinal axis.

73. The injection molding system of claim 72, wherein the nozzle adapter assembly (700) further includes a tubular spacer (704) received and retained in the bore of the nozzle adapter (706) by an end face of the barrel (750), wherein the static mixers (510) are positioned and retained along the bore of the nozzle adapter (706) between a shoulder of the nozzle tip (702) and the tubular spacer (704) that extends into the bore of the nozzle adapter (706).

74. The injection molding system of claim 38, arranged in a runner system of an injection mold (850).

75. The injection molding system of claim 38, wherein the first and second passageways are interconnected as a distinct series of intermeshed and interconnected passageways.

76. The injection molding system of claim 38, wherein the mixing portal is a connection passageway.

77. The injection molding system of claim 38, wherein the passageways are formed as interconnected helixes.

78. The injection molding system of claim 38, wherein the passageways are formed with straight longitudinal axes but with a helical outer form.

* * * * *